United States Patent [19]
Galle

[11] 3,860,902
[45] Jan. 14, 1975

[54] LOGGING METHOD AND SYSTEM

[75] Inventor: Edward M. Galle, Houston, Tex.

[73] Assignee: Hughes Tool Company, Houston, Tex.

[22] Filed: Feb. 14, 1973

[21] Appl. No.: 332,468

[52] U.S. Cl............ 340/18 LD, 340/18 FM, 324/1, 175/56, 175/65
[51] Int. Cl............................................. G01v 1/40
[58] Field of Search...... 340/18 LD, 18 NC, 18 FM; 175/56, 65; 181/.5 BE

[56] References Cited
UNITED STATES PATENTS

| | | | |
|---|---|---|---|
| 3,309,656 | 3/1967 | Godbey | 340/18 LD |
| 3,405,770 | 10/1968 | Galle et al. | 175/56 |
| 3,416,487 | 12/1968 | Greene | 175/56 |
| 3,737,843 | 6/1973 | LePeuvedic et al. | 340/18 LD |
| 3,764,969 | 10/1973 | Cubberly, Jr. | 340/18 LD |

Primary Examiner—Maynard R. Wilbur
Assistant Examiner—H. A. Birmiel
Attorney, Agent, or Firm—Robert A. Felsman

[57] ABSTRACT

The specification discloses a method and system for logging a borehole through employment of an acoustic vibration oscillator adapted to be operated by fluid pumped down a tubing or drill string and acoustically coupled with a fluid filled acoustic tank or cavity, a portion of which is defined by the walls of the borehole. In operation, fluid is pumped down the drill string to the oscillator during or subsequent to drilling the borehole to generate acoustic vibrations having characteristics such as frequency and amplitude which change in response to the changes in the compliance of the acoustic tank. The changes in the acoustic vibration characteristics are detected and recorded in correlation with depth.

17 Claims, 6 Drawing Figures

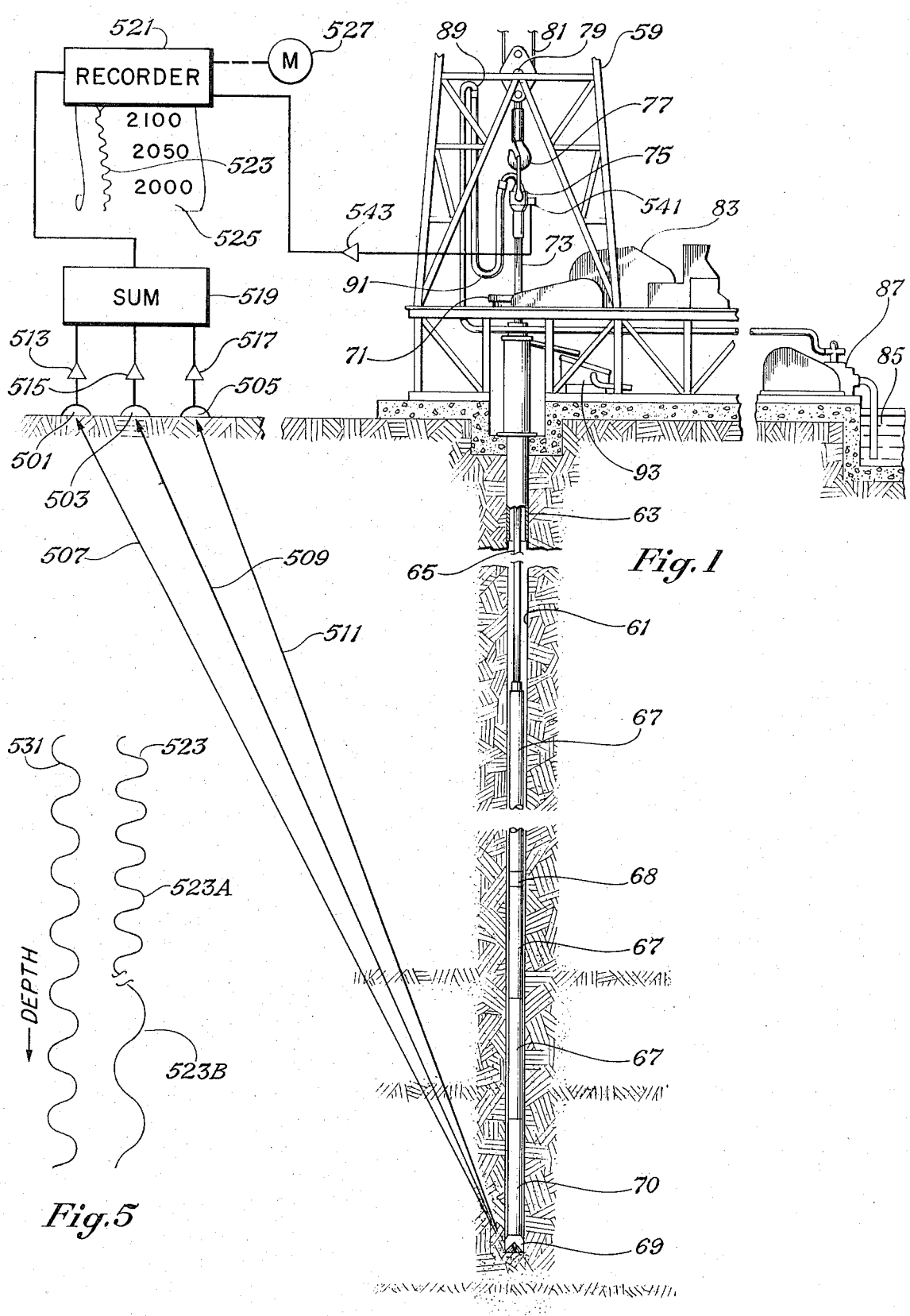

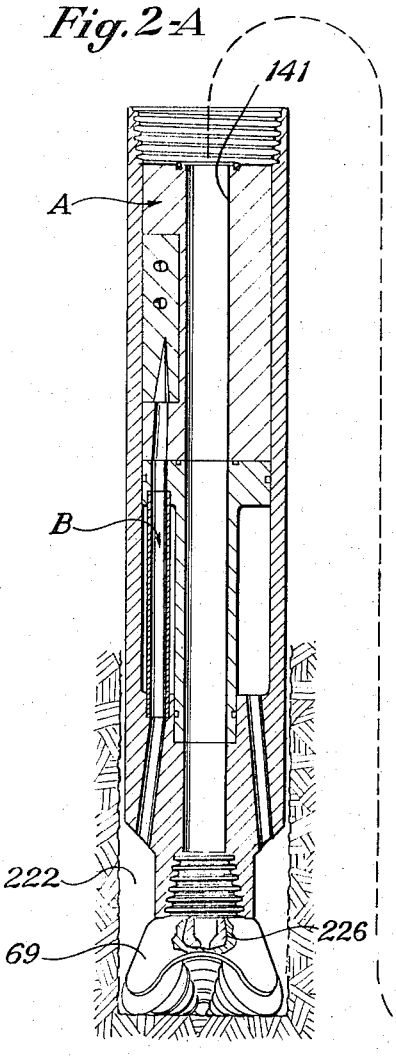
Fig.2-A
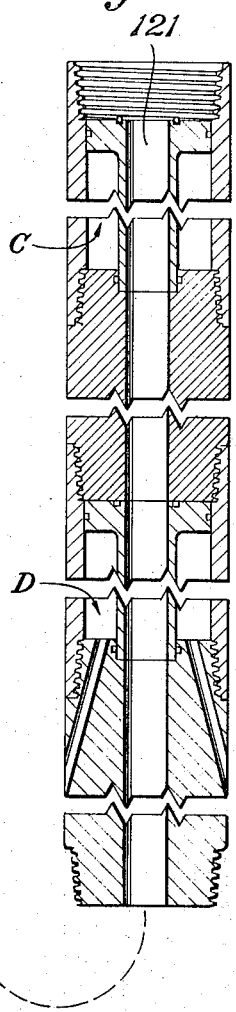
Fig.2-B
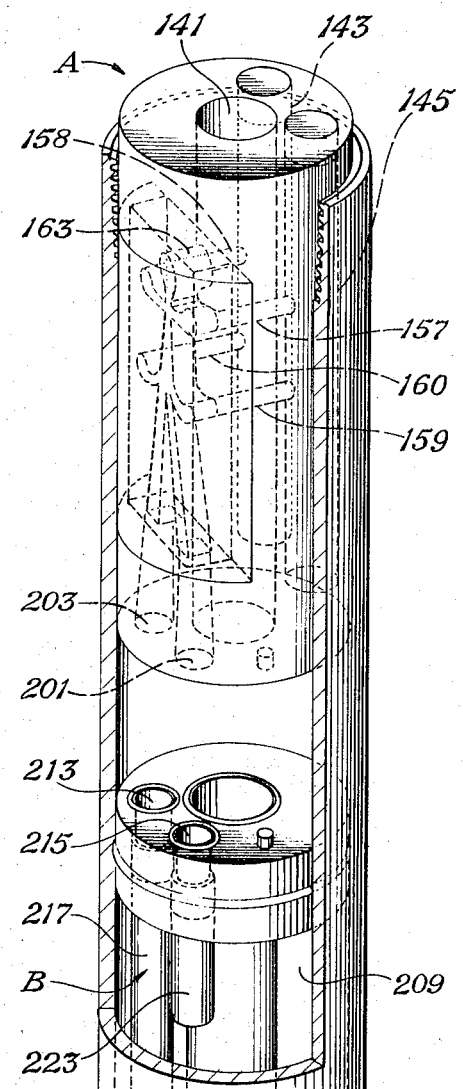
Fig.3
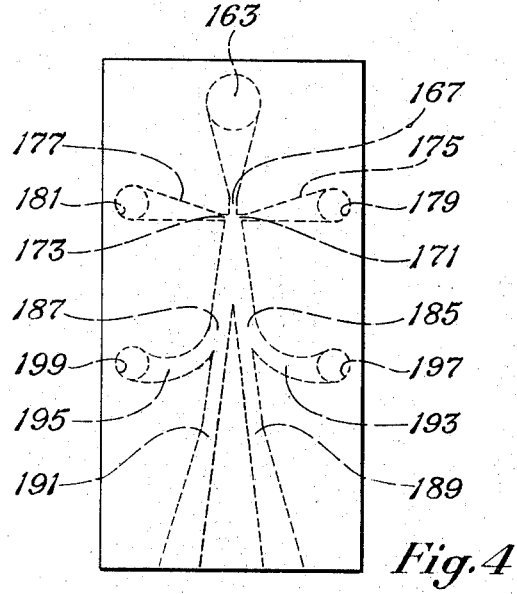
Fig.4

LOGGING METHOD AND SYSTEM

BACKGROUND OF THE INVENTION

1. Field of the Invention

This invention relates to well logging for the determination of geological formation changes with a method and system that permits logging simultaneously with drilling.

2. Description of the Prior Art

In U.S. Pat. Nos. 3,405,770 and 3,520,362 there are disclosed rotary drilling and well stimulation systems employing acoustic vibration oscillators for generating large pressure variations in a well bore. The acoustic vibration oscillator is operated by fluid pumped down the drill string and has an output acoustically coupled to the fluid in the cavity surrounding the bit. The vibrations may be confined to a selected zone in the borehole by the disclosed acoustical system. Further, the generated acoustical signals also may be detected at the surface of the well bore by known techniques.

In U.S. Pat. Nos. 2,956,634 and 2,956,635 are disclosed apparatus and methods for logging earth formations by generating a succession of time separated oscillatory sound pulses, each having an abrupt onset and detecting modifications in the frequency spectrum of the received pulse and correlating with the lithology.

SUMMARY OF THE INVENTION

The characteristics of the vibrations such as frequency and amplitude, generated with the apparatus shown in the first two patents mentioned above, may be shown to change theoretically with different subsurface formations and conditions. Since the subsurface formations form a portion of the walls of an acoustic compliance in a circuit that includes the oscillator, any change in the compliance will tend to alter the output of the oscillator. Thus by observing the changes in the output characteristics of the vibrations generated at different depths in a borehole, information may be obtained that is useful in distinguishing the various subsurface formations.

Accordingly, it is the general object of the invention to provide an improved method and system of well logging in which an acoustic vibration oscillator is acoustically coupled with an acoustic cavity or tank, part of which is formed by a portion of the borehole, in a manner such that characteristics of the oscillations change responsive to changes in the compliance of the tank.

Another object of the invention is to provide an improved well logging method and system in which a fluidic oscillator is acoustically coupled with a cavity in the bore such that the signal output of the oscillator has characteristics that change responsive to changes in the earth's formations and their conditions, such changing characteristics being correlated with depth to provide a log to distinguish changes in formations and conditions.

Another object of the invention is to provide an improved well logging method and system wherein changes in geological formations and conditions may be sensed at the surface of the earth simultaneously while drilling by use of an acoustic oscillator which experiences changes in signal characteristics in response to said changes in geological formations and conditions.

It is a further object of the present invention to employ the acoustic vibration generator in a rotary drilling system to enhance drilling operations and to provide a sound source for logging operations whereby logging may be carried out simultaneously while drilling.

In the operation of the preferred form of oscillator, fluid is pumped down the borehole to the oscillator to generate acoustic vibrations, the characteristics of which, such as frequency and amplitude, change in response to the changes in the compliance of the acoustic tank. For logging purposes, the acoustic vibrations generated are detected and recorded in correlation with the depth. The changes in the recorded characteristics of the oscillator output signal may be employed to provide information useful in distinguishing the various types of subsurface formations or their condition.

In the embodiment disclosed, the acoustic vibrations generated by the oscillator are detected at the surface by detecting means which may either be for example seismic detectors coupled to the surface of the earth or to the drill string or a pressure transducer acoustically coupled to the fluid in the bore of the drill string or the fluid in the annulus.

BRIEF DESCRIPTION OF THE DRAWINGS

FIG. 1 illustrates the combination of a logging system and a rotary drilling system, the latter of which employs an acoustic vibration generator that may be used to enhance drilling operations and which also is employed as a sound source to enable logging operations to be carried out simultaneously while drilling;

FIGS. 2-A and 2-B are a longitudinal section view illustrating the acoustic vibration generator, coupling device, and related equipment;

FIG. 3 is a perspective view of that portion of the apparatus shown in FIG. 2-A, with a portion thereof broken away to expose its interior. The upper, acoustic vibration generator portion of the apparatus is shown lifted from the normal operating position of FIG. 2-A to add clarity to the drawing; and FIG. 4 is a view of a portion of the acoustic vibration oscillator which is one component of the apparatus shown in FIGS. 2 and 3.

DETAILED DESCRIPTION OF THE INVENTION

Referring now to FIG. 1, there will be described the rotary drilling system employing the acoustic vibration generator or oscillator to enhance drilling operations and which also is employed as a sound source to enable logging operations to be carried out simultaneously while drilling. The numeral 59 designates a derrick located over a borehole 61 that contains surface casing 63, drill pipe 65, drill collars 67 and a drill bit 69. The acoustic vibration generator is identified at 70 and is connected in the drill string directly above the bit.

Rotation of the bit 69 is achieved by the engagement of a rotary table 71 with a kelly 73, which is the uppermost tubular member of the drill string. The kelly 73 is attached to a swivel 75 which is supported in the derrick 59 by hook 77, traveling block 79 and cable 81. The cable 81 is attached through pulleys at the top of the derrick (not shown) to the draw works 83, which lifts and lowers the drill string.

The fluid circulatory system consists of a sump 85 from which drilling mud is drawn by means of a mud pump 87. The mud travels to standpipe 89 in derrick 59, through mud hose 91, down kelly 73, and ultimately to drill bit 69. Cuttings from the bottom of the hole are washed by the mud up through borehole 61 and outside of the drill string, and are then separated from the mud by a shale shaker 93. The mud then returns to sump 85 where the circulatory process is repeated.

Referring now to FIGS. 2-A, 2-B, 3, and 4, the acoustic vibration generator is designated by letter A and may be referred to as a "fluidic" generator device in that it has no moving mechanical components. It is a high gain, bi-stable, fluidic amplifier with positive feedback to cause oscillations of the bi-stable unit. Also provided is a coupling device B which couples the output of the acoustic vibration generator with the drilling fluid located in an acoustic tank or cavity 222 surrounding the drill bit 69. As illustrated, the outer limits of the cavity 222 are defined by the borehole walls. Also provided are a pair of Helmholtz resonators designated by letters C and D. The acoustic vibration generator A, the coupling device B, and the Helmholtz resonators C and D are fully described in U.S. Pat. No. 3,405,770. A brief description however will be given as to the manner of operation of the drilling system including the acoustic vibration generator A and the coupling device B.

In operation, drilling fluid is pumped through the drill string and flows through the axial bore 121, through the bit nozzles 226, and flushes cuttings from the bottom of the borehole and carries them up the annulus between the drill string and the borehole walls to the surface.

A portion of the fluid flowing through the axial bore 141 (see FIGS. 2-A and 3) is diverted through a supply port or inlet passage 163 of the oscillator A. From input 163, the fluid flows from a power nozzle 167 (see FIG. 4) and alternatively flows into receiver channels 185 and 187. This alternating flow results from the positive feedback effected by feedback channels 193, 195; feedback ports 197, 199; apertures 159, 160; cavities formed in the axial bores 143, 145; apertures 157, 158; control ports 179, 181; passages 175, 177; and control nozzles 171, 173. During each half-cycle of oscillation, a majority of the fluid entering the receiver channels 185 or 187 flows into either diffuser channel 189 or 191 and to the outlet 201 or 203 of the acoustic vibration generator A.

The output of the diffuser channel 191 feeds aperture 213, tube 217 and aperture 219, which together with the fluid therein constitute an acoustic inertance. Aperture 219 communicates with the fluid in the cavity 222 surrounding the bit, the cavity 222 being in effect an acoustic compliance. The output of the diffuser channel 189 feeds aperture 215 and tube 223 which constitute another acoustic inertance. Tube 223 terminates with annular cavity 209 which constitutes another acoustic compliance. Aperture 225 is an acoustic inertance communicating between annular cavity 209 and the cavity 222 surrounding the drill bit. Thus the oscillator output is coupled with the drilling fluid on the exterior of the bit through the tubing string above the bit nozzles. To improve the reliability of oscillation on-set under high back pressure conditions, it is advantageous to insert flow restrictions in diffuser channels 189 and 191. However, the openings of the restrictions should be made as large as possible to minimize power loss. Suitable dimensioning of all the acoustical elements with the acoustical coupling circuitry, there are accomplished three objectives: (1) proper matching of the output impedance of the oscillator A with the dissipative load imposed by the bit nozzles; (2) effective phase inversion of the vibrations in one of the output legs of the oscillator A and; (3) the provision of a high Q system. Hence, the acoustic generator may be utilized to effect large pressure variations in the borehole fluid near the bottom of the borehole. The pressure variations may have a peak-to-peak amplitude of up to about 2,000 psi and may be generated in one embodiment at an average frequency of about 100 cycles per second.

As stated above, the characteristics, such as the frequency, of the generated oscillations vary while drilling in different types of formations. This is due to the changes in the compliance of the acoustic tank or cavity 222 when the cavity is located in different types of formations. The disclosed acoustic vibration generator is sensitive to the acoustical load imposed on it so that the generator will oscillate at the resonant frequency of the acoustical system. One element of the acoustical system is the compliance of cavity 222, thus the resonant frequency of the acoustical system changes when the compliance of said cavity changes, resulting in a change in the generated acoustic signal. The changes in the compliance of the cavity 222 are a function of a number of factors including the modulus elasticity and Poisson's ratio for the formations. The compliance of cavity 222 is also a function of the properties of the fluid in the However, Howver, such properties normally do not change rapidly during a drilling operation unless the drilling fluid is purposefully altered for changing drilling or hole conditions, such as for example when weighting up to prevent blow-out in the presence of formation gas pressure. Since such changes in the drilling fluid are intentionally made, the resulting changes in the oscillation frequency are easily identified from the frequency changes resulting from formation characteristic changes. Further, the compliance is a function of the volume of the cavity, which may change under certain drilling conditions that cause variations in hole diameter. If the diameter of the cavity significantly increases, the amplitude and frequency of the signal decrease with the apparatus shown. Thus by detecting and recording the changes in the signal characteristics of the oscillations of the generator A one can obtain information useful in distinguishing the various types or condition of formations. Since the energy generated by the generator A is of large magnitude, the acoustic vibrations may be detected by suitable equipment.

Referring to FIG. 1, a suitable detecting system in one embodiment comprises a closely spaced array of seismic detectors (geophones) illustrated at 501, 503, 505, coupled to the earth. Although only three detectors are illustrated it is to be understood that more may be employed. Arrows 507, 509 and 511 depict the acoustic or seismic energy propogating through the formations from the generator A to the uphole seismic detectors. The outputs of the detectors are amplified at 513, 515 and 517 and applied to a summing circuit 519, the output of which is applied to a recorder illustrated at 521. The recorder 521 may record the output of the summing circuit 519 in digital form or in analog form. As illustrated in FIG. 1, the recorder 521 records the output in analog form as a continuous trace 523 on the chart 525 of the recorder which is driven slowly by a motor illustrated at 527. Thus as the drilling progresses and the drill bit 69 and hence the oscillator A are lowered to different depths, a continuous trace 523 will be recorded and will reflect the frequencies of the acoustic vibrations generated in the borehole fluid by the generator A. If desired, the amplifiers 513, 515 and 517 may include passband filters to filter out unwanted noise above and below the normal frequency range of the generator A, or a spectral analysis of the recorded signal may be made to determine the generated frequency at any given depth. The seismic detectors 501, 503, and 505 will be located relatively close together whereby there effectively will be no phase differences in their outputs. Since the drilling rate will be relatively slow, an operator stationed at the detecting system may write on the chart 525 the depth at which the drill bit and hence the generator A are located. The depth can be determined from the length of drill collars 67 and drill pipes 65 employed in the drill string. The numbers 2000, 2050 and 2100 on the chart represent the depth at which the oscillator A was located when the trace portions next to these numbers were recorded.

By observing the frequency and/or amplitude of the trace 523 and/or by comparing the recorded signal trace with a standard signal trace one can obtain a measure of the change in frequency and/or amplitude to obtain information about the different formations in which drilling operations are being carried out. For example referring to FIG. 5, trace 531 illustrates a sinusoidal wave having a frequency of 100 cycles per second and which is employed as a standard. Trace 523 in FIG. 5 illustrates the frequency of the detected acoustic vibrations as recorded by the recorder 521 when the generator A was located in two different types of formations. When the generator A is located in one type of formation, its frequency and hence the frequency of the signal 523 may be increased compared to the standard frequency of trace 531 as illustrated by trace portion 523A. Trace portion 523B illustrates the frequency of the signal recorded while the generator is in a different type of formation. As can be seen, the frequency of trace portion 523B is lower than the standard frequency of trace 531 hence indicating a different type of formation. Although the comparison of the frequency of the trace recorded with the standard frequency has been described as being carried out manually it is to be understood that the comparison may be carried out with suitable electrical equipment.

As an alternative to the use of seismic detectors for detecting the acoustic vibrations, a pressure sensitive transducer illustrated at 541 may be attached to the swivel 75 to detect the oscillations produced by the generator A and transmitted up the fluid inside the drill string. In this embodiment, the output of the transducer 541 is amplified at 543 and then applied to the recorder 521 to record the trace 523. In addition the frequency output of the generator may also be detected by the motion of the drill pipe or by pressure changes in the fluid in the annulus.

The disclosed method may be used with the apparatus shown in U.S. Pat. No. 3,520,362 when logging a previously drilled borehole. In such cases it is advantageous to use upper and lower acoustical filters or resonators in the annulus for most efficient operation.

While the invention has been shown in only one of its forms, it will be understood by those skilled in the art that it is not so limited but is susceptible to various changes and modifications without departing from the spirit thereof.

I claim:

1. A method of carrying out logging operations in a borehole comprising the steps of:
   matching an acoustical oscillator operating frequency with the resonant frequency of an acoustical circuit that includes an acoustical coupler and a selected compliance to be partially formed by the wall of a borehole such that the oscillator will generate a selected signal which changes in response to compliance changes sensed by the oscillator;
   generating an acoustical signal in a borehole with said oscillator and coupler;
   acoustically coupling said signal with a selected acoustical compliance having walls partially formed by a portion of the borehole;
   moving said oscillator and said coupler up or down said borehole to expose differing portions of the borehole wall to sense compliance changes;
   the characteristics of the wave form of the signal altering in response to sensed changes in said acoustical compliance;
   detecting characteristics of the wave form of the signal; and
   recording said characteristics in correlation with borehole depth.

2. The method of claim 1 wherein said acoustical signal is generated fluidically with fluid pumped down the borehole.

3. The method of claim 2 wherein said acoustical signal is generated by the steps of:
   diverting at least a portion of the fluid flowing down the borehole into two channels;
   switching alternately fluid flow from one channel to another to generate out-of-phase outputs;
   inverting the phase of one output to match the phase of the other output; and
   coupling in phase flows with said compliance.

4. The method of claim 1 wherein said detection and recording operations are carried out at the surface of the earth.

5. The method of claim 4 wherein said detection operation is carried out with seismic detector means coupled to the earth.

6. The method of claim 4 wherein said detection operation is carried out with transducer means acoustically coupled with fluid in the borehole.

7. A method of carrying out logging operations in a borehole comprising the steps of:
   pumping a fluid down a borehole;
   generating an acoustical signal having a continuous wave form in said borehole;
   acoustically coupling said signal with a selected acoustical compliance having walls partially formed by a portion of the borehole;
   acoustically sensing at the oscillator said compliance through said coupling such that any changes in compliance varies the oscillator output signal;
   moving the oscillator and coupling through the borehole to expose differing portions of the borehole wall;
   detecting characteristics of the wave form of the signal; and
   recording said characteristics in correlation with borehole depth.

8. The method of claim 7 wherein said acoustical signal is generated fluidically with fluid pumped down the borehole.

9. The method of claim 8 wherein said acoustical signal is generated by the steps of:
- diverting at least a portion of the fluid flowing down the borehole into two channels;
- switching alternately fluid flow from one channel to another to generate out-of-phase outputs;
- inverting the phase of one output to match the phase of the other output; and
- coupling in phase flows with said compliance.

10. The method of claim 7 wherein said detection and recording operations are carried out at the surface of the earth.

11. The method of claim 10 wherein said detection operation is carried out with seismic detector means coupled to the earth.

12. The method of claim 10 wherein said detection operation is carried out with transducer means acoustically coupled with fluid in the borehole.

13. A system for logging the subsurface formations traversed by a borehole for characteristics of interest, comprising:
- an acoustic vibration oscillator adapted to be operated by fluid pumped down a conduit and having an output to be acoustically coupled with an acoustic cavity, a portion of which is defined by the walls of the borehole;
- means for locating the oscillator in the borehole to be logged;
- means for pumping fluid down the conduit to the oscillator to generate acoustic vibrations, the frequency of which changes in response to the changes in the compliance of said cavity;
- detecting means for detecting the acoustic vibrations generated; and
- recording means for recording the acoustic vibrations detected.

14. The logging system of claim 13 wherein said acoustic oscillator is a fluidic oscillator.

15. In a rotary method of drilling boreholes in the earth in which a drill bit is suspended from a drill string and rotated while circulating a drilling fluid through the drill string, drill bit, and up the annulus between the drill bit and borehole and wherein an acoustic vibration oscillator is operated near the bottom of the borehole to produce acoustic vibrations in the borehole fluid, said acoustic vibration oscillator being adapted to be operated by a portion of the fluid pumped down the drill string and having an output to be acoustically coupled with a selected acoustic cavity, a portion of which is defined by the walls of the borehole, the method of simultaneously logging the subsurface formations traversed by the borehole, comprising the steps of;
- matching an acoustical oscillator operating frequency with the resonant frequency of an acoustical circuit that includes a coupler and a selected compliance to be partially formed by the wall of a borehole such that the oscillator will generate a selected signal which changes in response to compliance changes;
- generating acoustic vibrations with said oscillator;
- advancing said oscillator and said coupler in said borehole while drilling to expose differing portions of the borehole wall to sense compliance changes;
- detecting the acoustic vibrations generated; and
- recording in correlation with depth the acoustic vibrations detected to obtain a record of the changes of the frequency of the acoustic vibrations in response to the changes in subsurface formations.

16. In a rotary drilling system wherein a drill bit is suspended from a drill string and rotated while circulating a drilling fluid through the drill string, drill bit nozzles and up the annulus between the drill bit and borehole and wherein an acoustic vibration oscillator has its output coupled with said fluid near the bottom of the borehole to produce acoustic vibrations in the borehole fluid, said acoustic vibration oscillator being adapted to be operated by the fluid pumped down the drill string and having an output to be acoustically coupled with an acoustic cavity, a portion of which is defined by the walls of the borehole, the combination therewith of:
- coupler means to acoustically couple said oscillator output with the drilling fluid on the exterior of the bit through the drill string above said bit nozzles, said oscillator, coupler, and a selected compliance, partially defined by the wall of a borehole, being matched such that the oscillator will generate a selected signal which changes in response to compliance changes sensed by the oscillator;
- detector means for detecting the acoustic vibrations generated; and
- recording means for recording the acoustic vibrations detected to obtain a measure of the frequency changes of the acoustic vibrations in response to the changes in subsurface formations.

17. A method of carrying out logging operations in a borehole comprising the steps of:
- pumping a fluid down said borehole;
- diverting at least a portion of said fluid flowing down the borehole into two channels;
- switching alternately fluid flow from one channel to another;
- coupling said flows to an acoustic circuit whereby the frequency of the generated signal will be dependent on the resonate frequency of the acoustic system, one of the elements of the acoustic system being an acoustic compliance having walls partially formed by a portion of the borehole; detecting the frequency of the generated signal; and recording said frequency in correlation with borehole depth.

* * * * *